United States Patent [19]
Schlitters

[11] Patent Number: 6,092,447
[45] Date of Patent: Jul. 25, 2000

[54] SHAVE TOOL HOLDER INCLUDING A PRECISE CALIBRATION ASSEMBLY FOR MACHINING A ROTATING WORKPIECE

[75] Inventor: David R. Schlitters, Warren, Mich.

[73] Assignee: Screw Machine Tool Company, Inc., Warren, Mich.

[21] Appl. No.: 09/232,483

[22] Filed: Jan. 15, 1999

[51] Int. Cl.[7] .................................................. B23B 29/16
[52] U.S. Cl. ................................ 82/157; 82/162; 82/164; 82/170
[58] Field of Search ........................... 82/157, 162, 164, 82/170, 115, 12, 86

[56] References Cited

U.S. PATENT DOCUMENTS

| | | | |
|---|---|---|---|
| 2,364,320 | 12/1944 | Schlitters | 82/157 |
| 2,389,853 | 11/1945 | Harris | 82/157 |
| 2,746,332 | 5/1956 | Smith | 82/157 |
| 3,094,024 | 6/1963 | Synk et al. | 82/157 |
| 3,576,145 | 4/1971 | Bernath | 82/157 |
| 3,841,179 | 10/1974 | Brown, II . | |
| 3,848,865 | 11/1974 | Bird . | |
| 4,350,059 | 9/1982 | Ainoura . | |
| 4,399,639 | 8/1983 | Lessway . | |
| 4,647,100 | 3/1987 | Lessway . | |
| 4,650,237 | 3/1987 | Lessway . | |
| 4,754,673 | 7/1988 | Hiestand . | |
| 4,986,151 | 1/1991 | Horn . | |
| 5,058,468 | 10/1991 | Lessway . | |
| 5,109,720 | 5/1992 | Kasuga . | |
| 5,237,780 | 8/1993 | Lessway | 82/157 X |
| 5,460,452 | 10/1995 | Hara . | |
| 5,737,984 | 4/1998 | Francia | 82/157 |
| 5,809,855 | 9/1998 | Francia . | |
| 5,820,311 | 10/1998 | Grun et al. . | |

OTHER PUBLICATIONS

Automatic Machining Magazine—Oct. 1998 Davenport Brochure.

*Primary Examiner*—Henry W. H. Tsai
*Attorney, Agent, or Firm*—Gifford, Krass, Groh, Sprinkle, Anderson & Citkowski, P.C.

[57] ABSTRACT

A shave tool holder having a body, a platform base and a vertically extending superstructure. An elongate shank portion extends from the body and mounts the body to a holder block. The holder block is reciprocally actuated in a horizontal direction in combination with being pivotally actuated in a vertical direction. A cutter insert is releasably secured upon the platform base. A roller is mounted to a support portion which is in turn secured to the vertically extending superstructure. The roller and support portion are capable of being vertically actuated up and down along the superstructure by a bolt. The enlarged head portion includes a plurality of radially outwardly extending markings corresponding with a circumferential array of the enlarged head portion. The enlarged head portion is capable of being rotatably engaged to adjust a selected marking in aligning fashion with a further reference marking extending from the tool holder body and to establish a desired minimal distance between an exterior facing surface of the roller and the cutter insert, the minimal distance corresponding to a desired outer diameter sizing operation of a rotating workpiece. In operation, the roller is upwardly actuated by the rotating workpiece and the cutting tool is brought into contact with the workpiece upon forward reciprocation of the holding block, the holding block being reverse reciprocated to withdraw the body from the machined workpiece.

8 Claims, 4 Drawing Sheets

SHAVE TOOL HOLDER INCLUDING A PRECISE CALIBRATION ASSEMBLY FOR MACHINING A ROTATING WORKPIECE

BACKGROUND OF THE INVENTION

1. Field of the Invention

The present invention relates generally to shave tool holder devices and, more particularly, to a shave tool holder exhibiting a precise calibration assembly for vertically adjusting a roller support portion of a shave tool holder.

2. Description of the Prior Art

Shave tool holder and cutter assemblies are well known in the art for use in machining a rotary turning workpiece which is mounted upon a spindle. The assembly is typically mounted within a holder block which is in turn mounted in a "floating" arrangement so that it is capable of being reciprocally actuated in both horizontal and vertical directions. Such multi-directional reciprocating motion is typically provided by a machine cross slide which is known in the art and a swing arm which forms a portion of a conventional slide assembly. Reference is made to the Davenport screw machine as described in the prior art.

Used in combination with such a shave tool holder is an appropriately configured cutter insert which is mounted upon a platform base of the holder. A roller and support portion is mounted to a superstructure of the shave tool holder and is vertically adjustable within a guide portion by means of a standard bolt which is secured at an upper enlarged head to the tool holder. In operation, the roller is upwardly actuated by the rotating workpiece and the cutting tool is brought into contact with the workpiece upon forward reciprocation of the holder and cutter assembly and prior to reverse reciprocation to withdraw the body from the machined workpiece.

A desired minimal distance is established between an exterior facing surface of the roller and the installed cutter insert and ideally corresponds with a desired outer diameter sizing operation to be performed upon the rotating workpiece. The achievement of the desired diameter sizing operation is typically accomplished through a trial and error procedure in which an approximate measurement is taken of the distance between the exterior face of the roller and the cutter insert with a caliper or like measuring tool. A sample workpiece is then turned by the spindle and is machined in a trial iteration of the tool and assembly. The workpiece is then inspected and measured for degree of error from the desired dimensions and the distance between the roller and cutter is again adjusted until a further sample workpiece is produced which satisfies the dimensional requirements established for the part and prior to engaging a volume production.

Additional examples of prior art shave tool holders are illustrated in U.S. Pat. Nos. 5,809,855 and 5,737,984, issued to Francia, as well as the C. J. Winter Machine Works advertisement for a shave tool holder as described in the Automatic Machining magazine, October, 1998.

SUMMARY OF THE PRESENT INVENTION

The present invention is a shave tool holder for machining a rotating workpiece and which employs an improved calibrating assembly for establishing a precise minimal distance between a workpiece supported roller and a cutter insert for providing precise outer diameter sizing of the rotating workpiece. The present invention is an improvement over prior art shaving tool holders which require one or more trial and error shavings of a rotating workpiece before arriving at an acceptable dimensional tolerance.

The shave tool holder includes a platform base upon which is supported a cutter insert. The cutter insert is typically interchangeable as is provided by interengaging dovetail projections and recesses existing between and underside of the cutter insert and the surface of the platform base. A vertically extending superstructure extends from the platform base and includes a workpiece support roller and supporting portion which is mounted so as to be vertically actuable along the superstructure.

The ability to move the roller and support up and down is typically provided by a plurality of vertically extending, parallel and spaced apart guide portions formed upon the vertical superstructure which permit the roller and support to be indexably mounted and the roller support further includes a rear face suitably configured for engaging with the selected guide portion. A main and first bolt including an exteriorly threaded shaft extends downwardly and is rotatably interengaged within an elongate and interiorly threaded recess formed within the support portion. An enlarged head portion of the bolt is immovably secured upon an overhanging ledge extending from a top surface of the tool holder. A secondary bolt is provided in some instances and horizontally secures within selected ones of the vertically extending slotted guides of the vertical superstructure. A substantially flattened head of the second bolt provides the seating and sliding engagement within the rear configured face of the roller support and along the guide portions of the vertical superstructure.

Rotation of the enlarged head of the first bolt causes the roller support to travel up and down along the selected guide portion of the vertical superstructure. The enlarged head in the preferred embodiment includes a centrally located Allen wrench recess which receives a like Allen wrench tool. A precise calibration means is provided for establishing the desired minimal distance between the workpiece support roller and the opposing edge of the cutting insert and includes a plurality of outwardly radially extending markings corresponding with a circumferential array of the enlarged head portion. Each of the markings in the preferred embodiment corresponds with a 0.001" incremental degree of movement of the roller in an upwards or downwards direction.

In the preferred embodiment, the shave tool holder is mounted within a holding block which is in turn capable of being reciprocally actuated in a horizontal direction. At the same time, the tool holder/holding block is also capable of floating or up and down pivotally actuable motion which is provided by a conventional swing arm. This structure is necessary so that the shave tool holder can accomplish its desired machine stroke operation which is to be initially for the bottom rolling edge of the workpiece support roller to be located in a horizontal plane slightly below the top rotating surface of the workpiece.

Forward reciprocating motion of the shave tool holder causes the roller to engage and ride up on the rotating workpiece stock and to in turn guide the precisely spaced apart edge of the cutting insert to machine the outer diameter of the workpiece to the desired dimension. The diameter of the part piece is further shaved as the center line of the roller support is fed up to, or slightly beyond, a corresponding center line of the rotating workpiece.

An additional shaving support is arrayed at a spaced location relative to the work support roller for engaging the rotating surface of the workpiece at an offset location relative to the roller support forming a part of the shave tool holder. The shaving support includes an additional roller for engaging the rotating surface of the workpiece and is arranged perpendicular relative to a cutting face of the insert. Once machining of the workpiece outer diameter to the desired dimensions has been completed, the shave tool holder is reverse reciprocated and the part subsequently removed.

BRIEF DESCRIPTION OF THE DRAWINGS

Reference is now made to the attached drawings, when read in combination with the following specification, wherein like reference numerals refer to like parts throughout the several views, and in which.

DETAILED DESCRIPTION OF THE PREFERRED EMBODIMENTS

Figure 1:
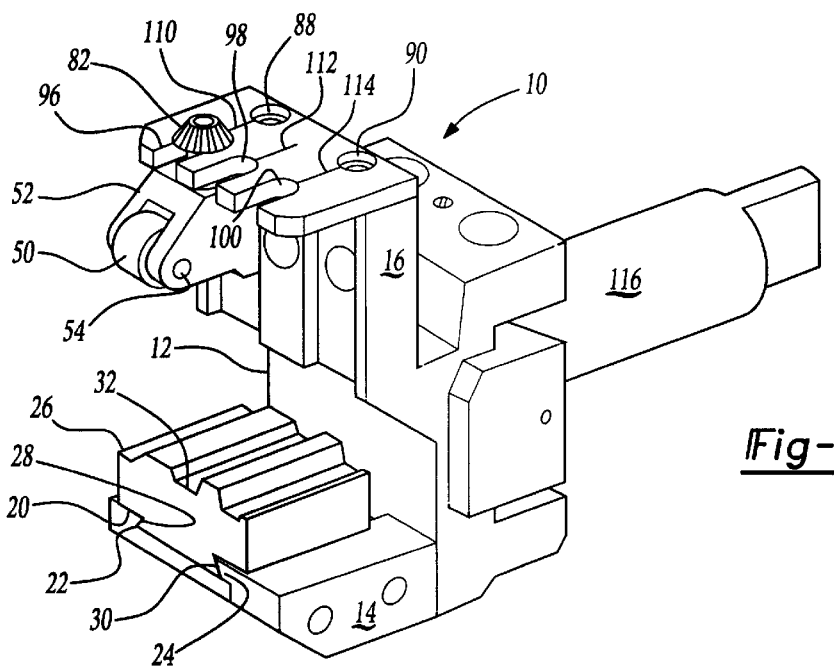
FIG. 1 is a perspective view of the shave tool holder according to the present invention.
Figure 2:
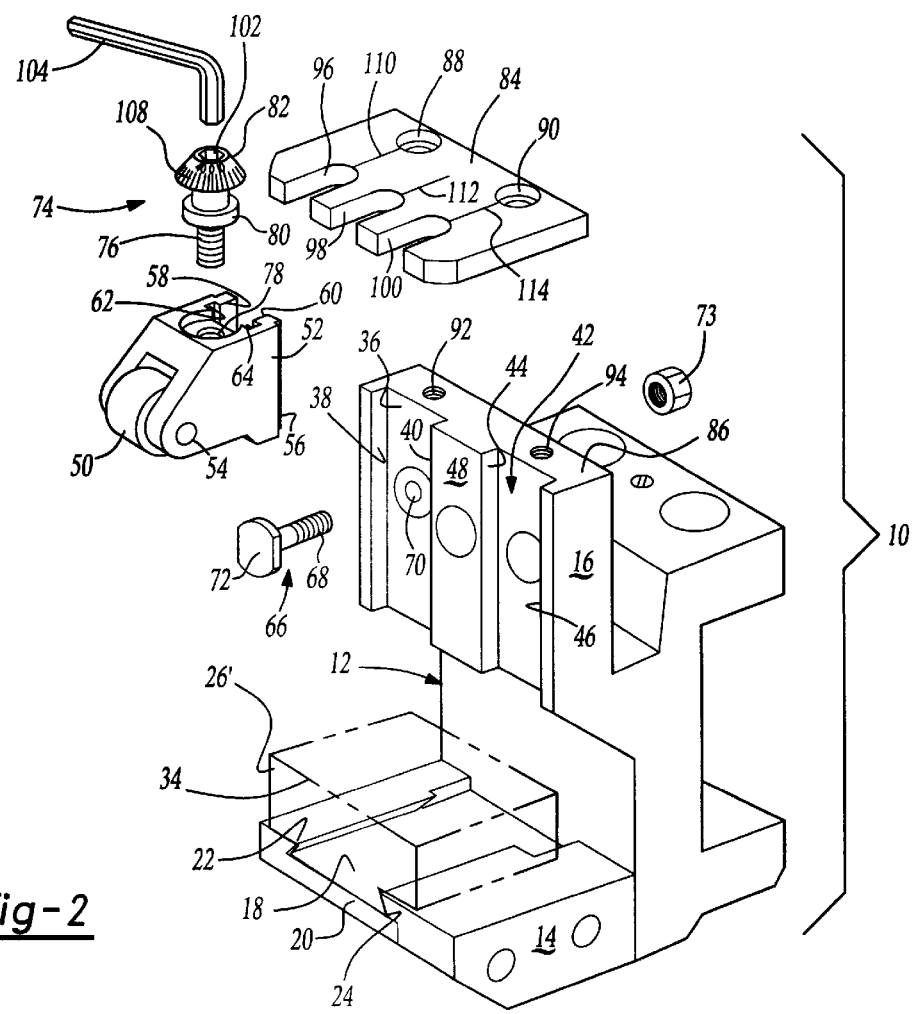
FIG. 2 is an exploded view of the shave tool holder as shown in FIG. 1 and further illustrating the slotted interengagement established between the roller support portion and the spaced apart indexable guide portions of the vertical superstructure.
Figure 3:
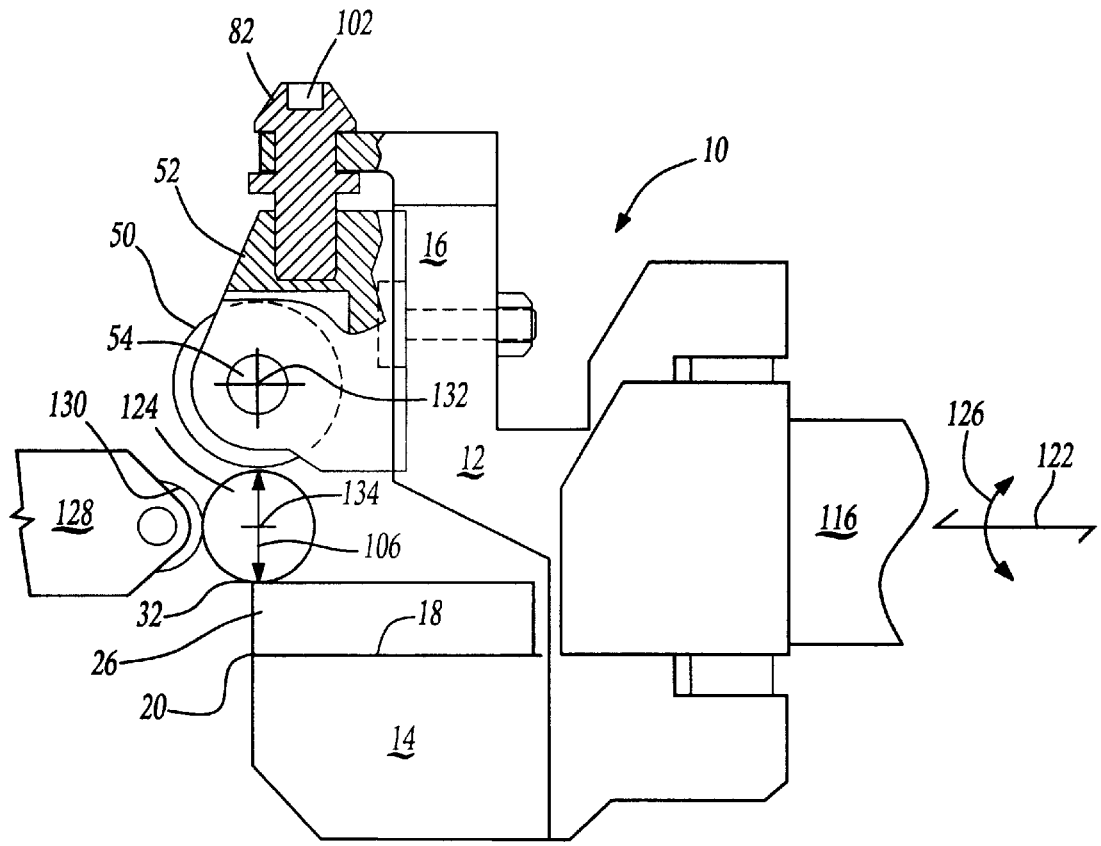
FIG. 3 is a front operational view of the shave tool holder according to the present invention engaged in an outer diameter sizing operation of a rotating workpiece and further showing the shaving support utilized with the present invention.

Referring now to FIGS. 1–3, a shave tool holder is shown at 10 according to the present invention. The shave tool holder 10 is constructed of a body 12 which includes a platform base 14 and a vertically extending superstructure 16. The platform base 14 defines an upper face 18 which terminates at an outwardly exposed edge 20. The upper face 18 is defined by a pair of spaced apart, parallel extending and dovetail shaped grooves 22 and 24 formed in the face 18.

A cutter insert 26 is provided and is capable of being slidably engaged upon the grooves 22 and 24 of the platform base 14. This is accomplished by providing corresponding dovetail edges 28 and 30 along a bottom surface of the insert 26 which corresponds in size and dimension with the dovetail shaped grooves 22 and 24 formed in the face 18. The insert 26 is slidably engaged by mating the dovetail edges 28 and 30 with the dovetail shaped grooves 22 and 24 and this permits one or more insert 26 to be quickly engaged and disengaged from the platform surface upper face 18 during multi-step machining operations.

The insert 26 is constructed of an appropriate material, such as a tungsten carbide or the like and is further provided with an appropriate cutting configuration (see at 32 in FIG. 1) to mirror the outer diameter shaving operation to be performed on the rotating workpiece as will be subsequently described. Referring further to cutter insert 26' illustrated in phantom in FIG. 2, it is further understood that a further cutting edge 34 of an insert can be flat or can be in any other configuration to suitably machine a rotating workpiece.

The vertically extending superstructure 16 of the shave tool holder 10 further includes a vertically extending surface within which is formed a plurality of vertically extending, parallel and spaced apart slotted guide portions. Specifically, and with reference again to FIG. 2, the superstructure 16 includes a first slotted guide portion 36 defined by vertically extending edges 38 and 40 and a second parallel spaced apart slotted guide portion 42 defined by vertically extending edges 44 and 46. A third guide portion 48 is also provided between the first and second slotted guide portions 36 and 42 and is defined by the vertically extending edges 40 and 44. The third guide portion 48 differs from the first and second slotted guide portions 36 and 42 in that it is an outwardly projecting portion rather than recessed. Reference will be subsequently made in this description to the supporting structure of the shave tool holder 10 which is utilized with selected guide portions according to the present invention.

Referring again to FIGS. 1–3, a workpiece support roller 50 constructed of a heavy duty steel material is rotatably supported upon a three dimensional support portion 52. Mounting of the roller 50 is typically provided by a pin 54 which extends lengthwise along the support portion 52 and freely rotatably mounts the roller 50. The support portion 52 of the roller assembly includes a vertically extending rear face 56 (see FIG. 2) which is adaptable for locating in alignment with a selected one of the slotted guide portions 36 or 42 or the projecting guide portion 48 arrayed therebetween the guide portions 36 and 42. The rear face 56 includes first and second opposing and recessed side walls 58 and 60 and a succeeding outwardly stepped recess in communication with the recessed side walls and defined by notched walls 62 and 64 (see again FIG. 2).

Figure 5:
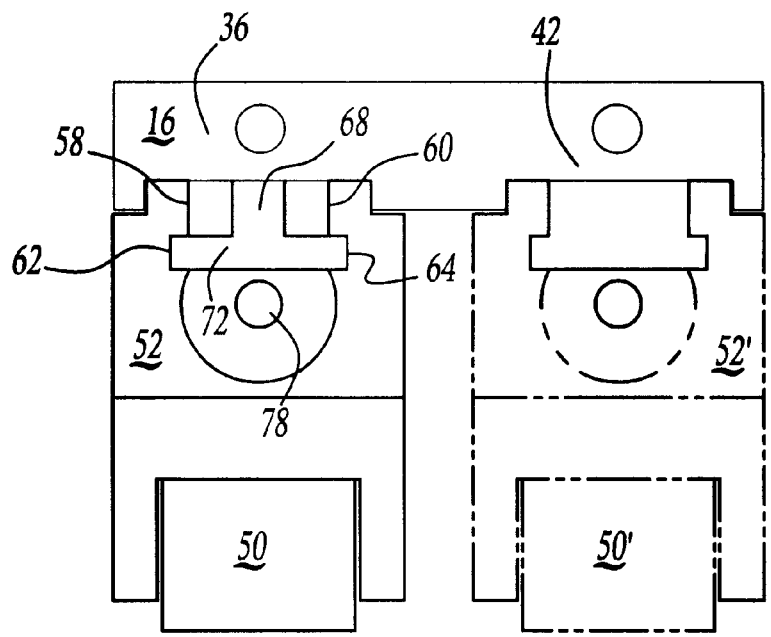
FIG. 5 is a view similar to that shown in FIG. 4 and further illustrating a top view of the shave tool holder with the calibration/actuating bolt and ledge removed and showing the ability to locate first and second workpiece support rollers in a side-by-side arrangement.

Referring again to FIGS. 1 and 2, as well as to the view of FIG. 5, a first mounting arrangement for the roller 50 and support 52 is illustrated and includes the roller 50 and support 52 arranged in alignment with the first slotted guide portion 36. The ability to maintain alignment of the roller and support within the slotted guide portion includes the provision of a horizontally extending bolt 66 (see FIG. 2) which includes a shaft 68 rotatably engaging within a horizontally extending internally threaded aperture 70 formed in the vertical superstructure 16 and in alignment with one of the slotted guide portions, such as guide portion 36. A substantially flat head portion 72 of the bolt 66 it configured so that is aligns with and engages the open recessed interior of the rear face of the support portion 52 and particularly the outwardly stepped recess of the notched walls 62 and 64. A nut 73 engages from a rear side of the vertical superstructure 16 of the tool holder engages an end portion of the threaded shaft 68 projecting from the rear side. The bolt 66 illustrated herein is of a secondary nature to a primary adjusting bolt to be subsequently described and is limited in its use to facilitating aligning support between the roller support portion and the alternating slotted guide portions 36 and 42.

Referring again to FIG. 5, a second roller 50' and support portion 52' is illustrated in phantom and is capable of being aligned with the slotted guide portion 42 in identical fashion as with the first roller and support and/or in place of or in combination with the first roller 50 and support portion 52. The option of utilizing two workpiece rollers and support portions upon the shave tool holder vertical structure is desirable in an outer diameter shaving operation of a particularly large or elongate workpiece where it is desirable to provide a fair length of rolling support.

Figure 6:
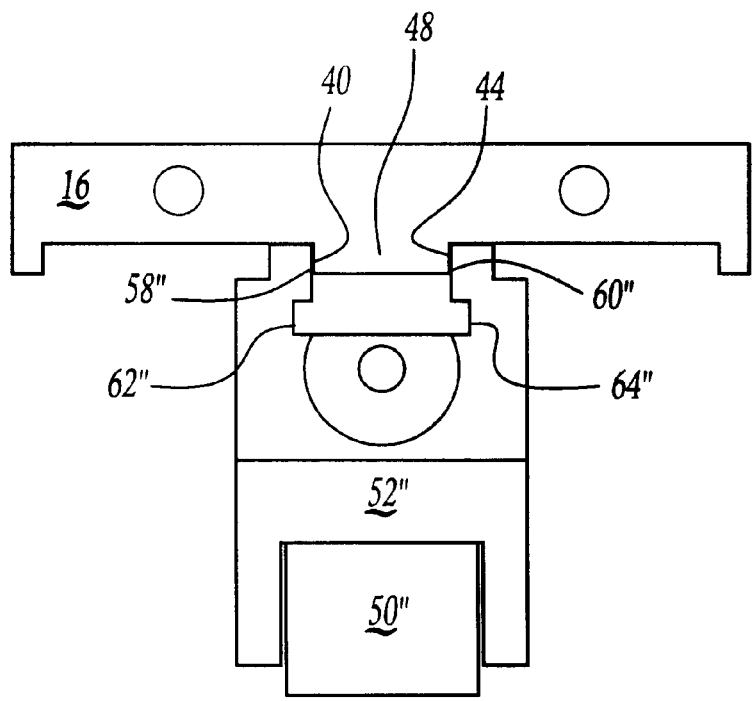
FIG. 6 is an alternate view similar to FIG. 5 and illustrating a further means for locating a single workpiece support roller at a central indexable guide portion of the vertical superstructure.

Referring now to FIG. 6, an alternate variant is shown of securing a recessed rear of a roller 50" and support portion 52" to the third guide portion 48 formed by the projecting and vertically extending edges 40 and 44. As is best shown by the overhead view of FIG. 6, the projecting edges 40 and 44 mate with the opposing and outwardly facing side walls 58 and 60 associated with the rear face of the support portion 52". The engagement of the roller and support portion with the third projecting guide portion 48 does not require the use of the secondary bolt 66 with flattened head for providing interengaging and aligning support, as this feature is provided by the mating of the projecting edges 40 and 44 with the outwardly facing side walls 58 and 60.

The ability to vertically actuate the roller and support portion in upwards and downwards directions is provided by a primary bolt 74 (see again the exploded view of FIG. 2). The bolt 74 includes an externally threaded shaft portion 76 which is rotatably interengaged within an elongate and internally threaded aperture 78 formed within the support portion 52. The bolt 74 further includes an intermediate and annular collar 80 which is separated a prescribed distance from a conically shaped and outwardly arrayed enlarged head 82.

Upon interengaging the threaded shaft portion 76 with the internally threaded aperture 78 of the support portion 52, it is necessary to establish a shoulder support for fixedly supporting the enlarged head 82. This is provided by a ledge 84 which is engaged upon a top surface 86 of the shave holder vertical superstructure 16 and the ledge 84 is secured in place by screws (not shown) which engage through apertures 88 and 90 in the ledge 84 and further apertures 92 and 94 in the top surface 86.

The ledge 84 includes an overhanging portion which defines first 96, second 98 and third 100 guides which are arrayed in alignment with the respective guide portions 36, 48 and 42, respectively. Each of the guides 96, 98 and 100 are defined by substantially grooved edges in the ledge 84 and which provide a seating engagement with the bolt 74 such that the annular collar 80 locates against an underside surface of the ledge 84 and the head 82 engages against a top side surface of the ledge 84.

Rotation of the bolt 74 through its enlarged head 82 causes the shaft 76 to rotatably interengage with the interiorly threaded aperture 78 in the support portion 52 and to cause the support portion and roller to move up and down. Referring again to FIG. 2, an Allen wrench recess 102 is shown formed centrally within the enlarged head 82 and is suitable for receiving an appropriate Allen wrench tool, illustrated at 104, for turning the bolt 74.

Figure 4:
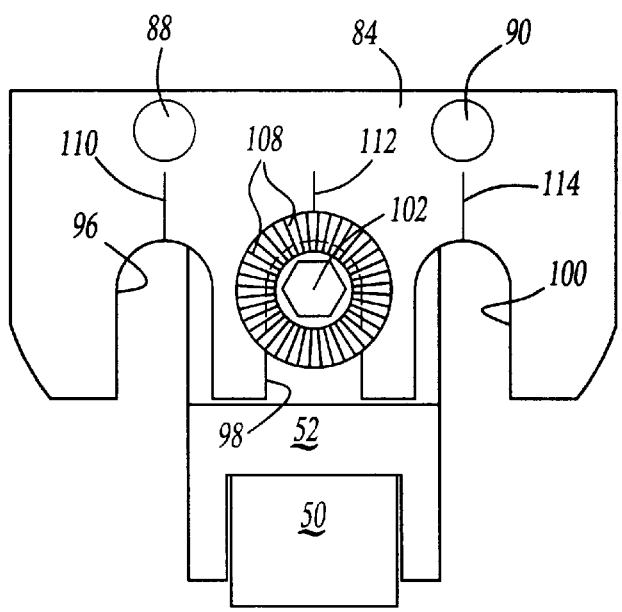
FIG. 4 is a top view of the ledge support and slotted guides for providing indexable location of the workpiece support roller.

A detailed calibration mechanism is provided according to the present invention for establishing a precise minimal distance (see 106 in FIG. 3) between the bottom edge surface of the roller 50 and the cutting edge 32 of the cutting insert 26. The calibration mechanism includes a plurality of radially outwardly extending markings 108 (see also FIG. 4) corresponding with a circumferential array of the enlarged head portion 82 of the bolt 74. The markings 108 are each preferably established at 0.001" increments and, upon mounting the roller 50 and support portion 52 within a selected guide portion of the vertical superstructure, align the circumferentially arrayed markings 108 with a further reference marking extending from a selected one of the guide portions along the ledge. Specifically, reference markings 110, 112 and 114 extend from the edges of the guides 96, 98 and 100, respectively, and provide a reference for the plurality of arrayed markings 108.

Figure 7:
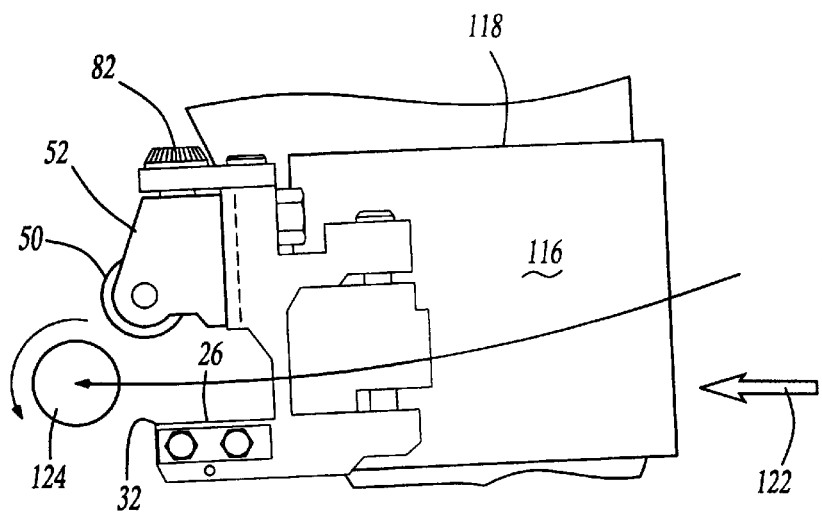
FIG. 7 is an operational view illustrating the floating nature of the shave tool holder prior to upwardly actuating engagement with the rotating workpiece.
Figure 8:
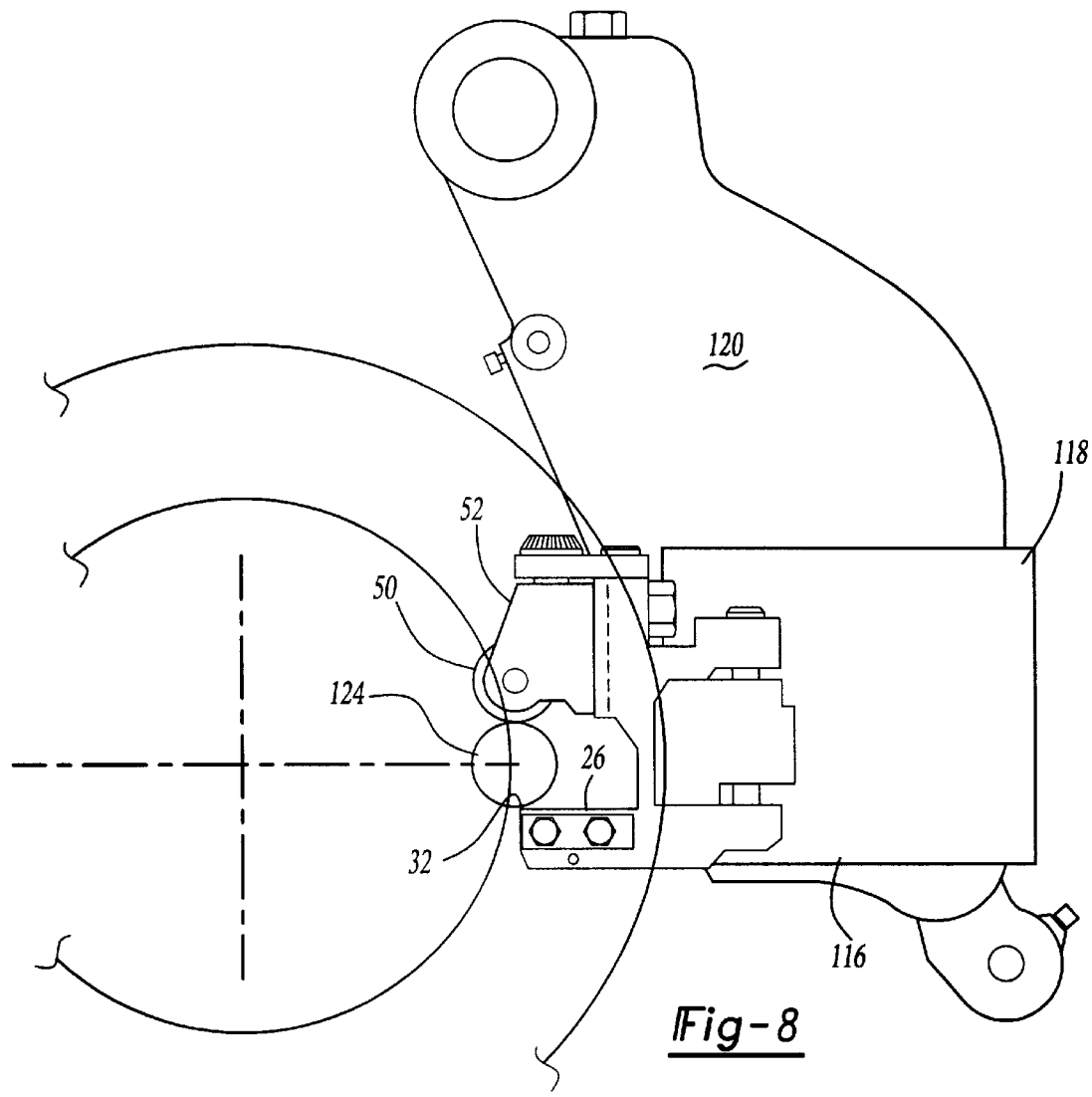
FIG. 8 is a still further operational view similar to that shown in FIG. 3 and showing the shave tool holder in its vertically and horizontally actuable position in which the cutting insert face engages the outer diameter surface of the rotating workpiece.

Referring again to FIG. 1, an elongate shank portion 116 extends from the body of the shave tool holder 10. Referring further to FIGS. 7 and 8, the shank portion 116 mounts the shave tool holder 10 within a holder block 118. The holder block 118 is in turn mounted upon a machine cross slide mechanism as is known in the art for facilitating reciprocating motion of the tool holder 10. Additionally, a suitable swing arm structure 120 (see FIG. 8) such as forms a part of a Davenport screw machine as discussed in the background of the invention, may form a part of the cross slide mechanism and acts to provide a floating or combined horizontal reciprocating and upward and downward pivoting motion of the shave tool holder.

Referring again to FIG. 7, the shave tool holder 10 is illustrated in an initial position in which it extends in a slightly downward tilting direction. The initial machine stroke causes the shave tool holder 10 to move forwardly. The direction of the stroke is illustrated by directional arrow 122 in FIGS. 3 and 7 and, upon a rotating workpiece 124 being contacted by an rolling edge surface of the roller 50, the body of the shave tool is caused to pivot in an upward direction (see arrow 126 in FIG. 3 and FIG. 8) and the cutting edge 32 of the insert tool 26 is brought into contact with the exterior surface of the rotating workpiece 124. The cutting insert then machines the exterior configuration of the workpiece until its outer diameter matches the specification for the part. The machine cross slide then reverse reciprocates the shave tool holder to permit the workpiece part to be removed.

Referring to FIG. 3, a shaving support 128 is illustrated which is arrayed at an offset location relative to the roller 50 secured to the support portion 52. The shaving support 128 includes an additional roller 130 for engaging the rotating surface of the workpiece and which is arrayed a perpendicular distance from the cutting edge of the insert 26. The purpose of the shaving support 128 is to provide additional support to the rotating workpiece 124 as it is machined to its desired diameter dimensions. Furthermore, the forward stroke of the reciprocating cycle ideally advances a centerline 132 of the workpiece support roller 50 to a point in line or just beyond a centerline 134 of the workpiece 124 so as to ensure adequate cutting by the insert 26 of the workpiece.

Having described my invention, it is evident that the present invention discloses a novel and improved shave tool holder which provides for an improved vertical adjustment/calibration assembly for ensuring more precise adjusting the distance between the work support roller and the cutting edge of the insert so as to machine a rolling workpiece and without the need for time consuming measurements and trial and error procedures for accomplishing the proper distancing of the roller and cutting insert.

Additional embodiments will become apparent to those skilled in the art to which it pertains without deviation from the appended claims:

I claim:

1. A shave tool holder for machining a rotating workpiece, comprising:

a body having a platform base and a vertically extending superstructure, an elongate shank portion extending from said body and mounting said body to a holder block, said holder block capable of being reciprocally actuated in a horizontal direction in combination with being pivotally actuated in a vertical direction;

a cutter insert being releasably secured upon said platform base;

a roller mounted to a support portion which is in turn secured to said vertically extending superstructure, said superstructure including first and second spaced apart, parallel extending and slotted guide portions, an outwardly projecting portion extending between said first and second spaced apart slotted guide portions;

a ledge secured to a top surface of said body, said ledge including a horizontally extending and overhanging portion defining first, second and third guides arranged in generally aligning fashion with said first and second slotted guide portions and said outwardly projecting portion; and adjustment means for vertically actuating said support portion and said roller along said vertically extending superstructure, said adjustment means further comprising a first externally threaded bolt with an enlarged head portion capable of being supported upon a selected guide portion of said ledge, said externally threaded bolt extending downwardly and rotatably interengaging within an elongate and interiorly threaded recess formed within said support portion, said support portion further including a vertically extending rear face for engaging with a selected one of said slotted guide portions and said outwardly projecting portion, said adjustment means further including calibration means for establishing a desired minimal distance between an exterior facing surface of said roller and said cutter insert, said calibration means further comprising a plurality of radially outwardly extending markings corresponding with a circumferential array of said enlarged head portion of said first bolt, said enlarged head portion capable of being rotatably engaged so as to adjust a selected marking in aligning fashion with a further reference marking extending from said selected guide portion along said ledge, said minimal distance corresponding to a desired outer diameter sizing operation of the rotating workpiece;

wherein said roller is upwardly actuated by the rotating workpiece and said cutting tool is brought into contact with the workpiece upon forward reciprocation of said holding block, said holding block being reverse reciprocated to withdraw said body from the machined workpiece.

2. The shave tool holder as described in claim 1, further comprising a second bolt horizontally secured within said vertically extending superstructure and in alignment with at least one of said said first and second slotted guide portions and said outwardly projecting portion, a substantially flat head portion of said second bolt providing for sliding engagement along said rear face of said support portion.

3. The shave tool holder as described in claim 1, each of said radially outwardly extending markings establishing an accuracy of 0.001 of an inch.

4. The shave tool holder as described in claim 1, said enlarged head of said bolt further comprising an Allen wrench recess for receiving a suitable Allen wrench tool to rotatably engage said bolt.

5. The shave tool holder as described in claim 1, said platform base further comprising a pair of spaced apart, parallel extending and dovetail shaped grooves extending inwardly from an exposed edge thereof, said cutter insert further including a corresponding dovetail bottom suitable for slidably interengaging with said dovetail grooves to mount said cutter insert.

6. The shave tool holder as described in claim 1, further comprising a shaving support arrayed a spaced and perpendicular distance from a cutting face of cutter insert, said shaving support including an additional roller for engaging the rotating surface of the workpiece at an offset location relative to said roller secured to said support portion.

7. The shave tool holder as described in claim 1, further comprising said holder block being mounted to a swing arm for providing floating vertical and horizontal motion of said shave tool holder.

8. A shave tool holder for machining a rotating workpiece, comprising:

a body having a platform base and a vertically extending superstructure, said superstructure including first and second spaced apart, parallel extending and slotted guide portions, an outwardly projecting portion extending between said first and second spaced apart slotted guide portions, an elongate shank portion extending from said body and mounting said body to a holder block, said holder block capable of being reciprocally actuated in a horizontal direction in combination with being pivotally actuated in a vertical direction;

said platform base including a pair of spaced apart, parallel extending and dovetail shaped grooves extending inwardly from an exposed edge thereof, a cutter insert including a corresponding dovetail bottom suitable for slidably interengaging with said dovetail grooves to mount said cutter insert upon said platform base;

a roller mounted to a support portion which is in turn secured to said vertically extending superstructure along at least one of said first and second parallel and spaced apart slotted guide portions and said outwardly projecting portion; and adjustment means for vertically actuating said support portion and said roller along said vertically extending superstructure, said adjustment means further including an exteriorly threaded bolt which is rotatably interengaged with an elongate and interiorly threaded aperture formed within said support portion, said bolt terminating in an enlarged head portion which is supported upon a ledge of said body;

calibration means for establishing a desired minimal distance between an exterior facing surface of said roller and said cutter insert, said minimal distance corresponding to a desired outer diameter sizing operation of the rotating workpiece, said calibration means including a plurality of radially outwardly extending markings corresponding with a circumferential array of said enlarged head portion, said enlarged head portion capable of being rotatably engaged so as to adjust a selected marking in aligning fashion with a further reference marking extending from said roof;

wherein said roller is upwardly actuated by the rotating workpiece and said cutting tool is brought into contact with the workpiece upon forward reciprocation of said holding block, said holding block being reverse reciprocated to withdraw said body from the machined workpiece.

* * * * *